(12) United States Patent
Studor

(10) Patent No.: US 9,499,385 B1
(45) Date of Patent: Nov. 22, 2016

(54) SYSTEM AND METHOD FOR BREWING AND DISPENSING COFFEE USING CUSTOMER PROFILING

(75) Inventor: Charles F. Studor, Austin, TX (US)

(73) Assignee: Briggo, Inc., Austin, TX (US)

( * ) Notice: Subject to any disclaimer, the term of this patent is extended or adjusted under 35 U.S.C. 154(b) by 615 days.

(21) Appl. No.: 12/762,099

(22) Filed: Apr. 16, 2010

Related U.S. Application Data

(60) Provisional application No. 61/170,400, filed on Apr. 17, 2009.

(51) Int. Cl.
*B67D 3/00* (2006.01)

(52) U.S. Cl.
CPC ........... *B67D 3/0003* (2013.01); *B67D 3/0019* (2013.01); *B67D 3/0022* (2013.01)

(58) Field of Classification Search
CPC . B67D 3/0003; B67D 3/0019; B67D 3/0022
USPC .......................... 700/233, 234, 236, 239, 244
See application file for complete search history.

(56) References Cited

U.S. PATENT DOCUMENTS

| | | | |
|---|---|---|---|
| 5,450,938 A * | 9/1995 | Rademacher | 194/206 |
| 6,726,947 B1 | 4/2004 | Gutwein et al. | |
| 6,759,072 B1 * | 7/2004 | Gutwein et al. | 426/433 |
| 7,401,613 B2 | 7/2008 | Carhuff et al. | |
| 7,519,451 B2 * | 4/2009 | Hartnell et al. | 700/244 |
| 7,580,859 B2 | 8/2009 | Economy et al. | |
| 7,757,896 B2 * | 7/2010 | Carpenter et al. | 222/129.4 |
| 7,899,713 B2 * | 3/2011 | Rothschild | 705/26.5 |
| 7,913,879 B2 * | 3/2011 | Carpenter et al. | 222/129.4 |
| 8,032,251 B2 * | 10/2011 | Monn | 700/233 |
| 8,162,176 B2 * | 4/2012 | Rudick | 222/1 |
| 8,340,815 B2 * | 12/2012 | Peters | B67D 1/0041 700/232 |
| 8,417,377 B2 * | 4/2013 | Rothschild | 700/233 |
| 8,434,642 B2 * | 5/2013 | Rudick | 222/1 |
| 8,515,574 B2 * | 8/2013 | Studor | A47J 31/44 426/433 |
| 8,606,396 B2 * | 12/2013 | Claesson et al. | 700/239 |
| 8,688,277 B2 * | 4/2014 | Studor | A47J 31/44 422/62 |
| 8,996,178 B2 * | 3/2015 | Studor | A47J 31/44 422/62 |
| 2003/0070555 A1 | 4/2003 | Reyhanloo | |
| 2003/0236706 A1 | 12/2003 | Weiss | |
| 2004/0177762 A1 * | 9/2004 | Gutwein et al. | 99/279 |
| 2004/0249502 A1 * | 12/2004 | Truong | B60P 3/0257 700/232 |
| 2005/0125317 A1 | 6/2005 | Winkelman et al. | |
| 2006/0081653 A1 * | 4/2006 | Boland et al. | 222/243 |
| 2006/0149415 A1 | 7/2006 | Richards | |
| 2006/0190419 A1 * | 8/2006 | Bunn | G06N 99/005 706/2 |

(Continued)

*Primary Examiner* — Michael K Collins
(74) *Attorney, Agent, or Firm* — Reising Ethington P.C.

(57) ABSTRACT

A system and method for brewing and dispensing beverages may use customer profiling to select beverages to be produced and presented to a given customer and/or messages to be displayed to the customer, based on customer-specific information stored on a loyalty card, in a local system, or remotely. A user interface mechanism may receive input identifying the given customer. A controller may select a base drink recipe dependent on the customer's identity, and may initiate production of a beverage using the selected drink recipe. Each drink recipe may specify an amount of water, coffee, flavorings, dairy, and/or other ingredients, and may be further customizable to add or remove ingredients and/or to change an amount thereof, based on received user input. The stored customer-specific information may include a customer identifier, account information, a purchase history, a message history, drink recipes, and/or an email address for each of a plurality of customers.

23 Claims, 11 Drawing Sheets

(56) References Cited

U.S. PATENT DOCUMENTS

| | | |
|---|---|---|
| 2006/0224450 A1 | 10/2006 | Moon |
| 2006/0260495 A1* | 11/2006 | Siedlaczek .................. 101/494 |
| 2007/0061487 A1 | 3/2007 | Moore et al. |
| 2007/0106565 A1 | 5/2007 | Coelho |
| 2007/0239549 A1* | 10/2007 | LaFauci ................ G06Q 10/06 705/15 |
| 2008/0050480 A1 | 2/2008 | Doglioni Majer |
| 2008/0116262 A1 | 5/2008 | Majer |
| 2008/0201241 A1* | 8/2008 | Pecoraro ............... G06Q 30/06 705/26.8 |
| 2009/0069932 A1* | 3/2009 | Rudick ........................ 700/239 |
| 2009/0095165 A1* | 4/2009 | Nosler et al. ............... 99/289 R |
| 2009/0105875 A1* | 4/2009 | Wiles ........................... 700/239 |
| 2009/0136632 A1 | 5/2009 | Gutwein et al. |
| 2009/0149988 A1* | 6/2009 | Hyde et al. .................. 700/231 |
| 2009/0157515 A1* | 6/2009 | Lafauci ................ G06Q 10/06 705/15 |
| 2009/0158937 A1* | 6/2009 | Stearns et al. ................ 99/280 |
| 2009/0293733 A1 | 12/2009 | Martin et al. |
| 2010/0024657 A9* | 2/2010 | Nosler et al. ............... 99/289 R |
| 2010/0030355 A1* | 2/2010 | Insolia et al. .................. 700/97 |
| 2010/0125362 A1* | 5/2010 | Canora et al. ............... 700/236 |
| 2010/0198726 A1 | 8/2010 | Doran et al. |

* cited by examiner

SYSTEM AND METHOD FOR BREWING AND DISPENSING COFFEE USING CUSTOMER PROFILING

This application claims priority to U.S. Provisional Application Ser. No. 61/170,400, entitled "System and Method for Brewing and Dispensing Coffee Using Multi-Stage Gravity Filter, Flow Interruption, and Precision Temperature Controller" and filed on Apr. 17, 2009, by Charles F. Studor.

BACKGROUND

1. Field of the Disclosure

This disclosure relates generally to systems and methods for brewing and dispensing coffee, and more particularly to systems and methods for making, filtering, brewing, processing, and dispensing beverages using customer profiling.

2. Description of the Related Art

Most coffee consumed outside of the home requires either experienced baristas, or expensive automated espresso machines. Both require significant capital to equip the retail setting, as well as logistical challenges with hiring and training personnel. The resulting retail locations require ongoing operating costs that dominate the costs associated with delivering high quality coffee. Alternatively, vending machines remove much of the cost and management difficulties, but the coffee quality suffers.

SUMMARY

A system and method for brewing and dispensing coffee and/or other beverages may use customer profiling to select beverages to be produced and presented to the customer and/or messages to be displayed to the customer, based on stored customer-specific information. The system for brewing and dispensing coffee may include a user interface mechanism that receives input identifying a given customer. The system may include a controller that selects one of a plurality of standard or custom drink recipes dependent on the identity of the given customer, and initiates production of a brewed beverage using the selected drink recipe, in some embodiments. For example, the input identifying the given customer may be received from a card reader, a radio frequency identification reader, a video capture device, a microphone, a keyboard, a soft keyboard, or a touch screen, in various embodiments. Each standard or custom drink recipe may specify an amount of two or more ingredients in a respective brewed beverage (e.g., water, coffee grounds, flavorings, dairy products, etc.)

In selecting the drink recipe, the controller may be configured to access information indicating one or more drink preferences of the given customer from a data structure that stores customer-specific information. In some embodiments, the data structure may be stored on a loyalty card, debit card, or gift card and may be accessed using the user interface mechanism. In other embodiments, the data structure may be stored on a remote system, and the system may include an interface configured to communicate with the remote system to retrieve this and/or other customer-specific information stored in the data structure. For example, in some embodiments, the data structure may be a central database accessible to a plurality of systems for brewing and dispensing coffee, and the database may store customer-specific information for a plurality of customers. The customer-specific information may also include one or more of: a customer identifier, account information, a purchase history, one or more custom drink recipes, one or more preferred standard drink recipes, a history of received messages, or an email address. In some embodiments, the user interface mechanism may be used to display all or a portion of the customer-specific information.

In some embodiments, the controller may be configured to select one or more messages to be displayed to the given customer dependent on the identity of the given customer, and these messages may be displayed using the user interface mechanism. In some embodiments, the user interface mechanism may also display the temperature of a brewed beverage, the temperature having been determined by the controller. In some embodiments, the user interface mechanism may be configured to detect the presence of the given customer, e.g., using an RFID reader or proximity sensor. The user interface may be further configured to receive input indicating the selection of a standard drink recipe previously ordered by the given customer, a custom drink recipe previously ordered by the given customer, and/or a customization of a standard or custom drink recipe previously ordered by the given customer. A drink customization may include an ingredient to be added to the standard or custom drink recipe, an ingredient to be removed from the standard or custom drink recipe, or a change in an amount of an ingredient of the standard or custom drink recipe, in some embodiments.

DETAILED DESCRIPTION OF EMBODIMENTS

The system and methods described herein, and the business model they suggest, may reduce the capital requirements and operating costs, yet produce a quality of coffee that rivals custom coffee shops. This may enable rapid scaling of the operation to many locations with minimal capital and employees.

This system described herein may in some embodiments be implemented as a fully automated kiosk used to serve a hot beverage, one of which may be coffee. The system may reduce the fixed overhead associated with serving high quality coffee as well as the capital required to create a point of sale (POS) or kiosk unit. The system and methods described herein may create a high quality coffee while eliminating the need for expert barristers, and may maximize the intervals between services by a technician. Various factors affecting the quality of hot beverages include consistency in the brew cycle, consistency in water temperature, the final service temperature, the rate at which the water passes through the coffee grounds, and the multi-stage filtering process.

The rate at which the water flows through the grounds is closely tied to the filter system. If the water remains in contact with the grounds for too long a time, it becomes bitter. If it passes too quickly through the grounds, it lacks robust flavor. In addition, a filter that allows the water to pass quickly also allows fine grounds to pass through the filter into the final product. Those grounds continue to "brew" in the finished product, releasing compounds that turn the coffee bitter over time.

Paper filters that catch the fine grounds often cause the water to remain in contact with the coffee for too long, causing bitter flavors, and/or they may themselves add unwanted flavors. Paper filters also present maintenance challenges and costs related to the material and replacement labor. Metal gold filters alone provide good water flow, but they allow fine grounds to remain with the final coffee product and may turn the coffee bitter and/or gritty when consumed.

Figure 1:
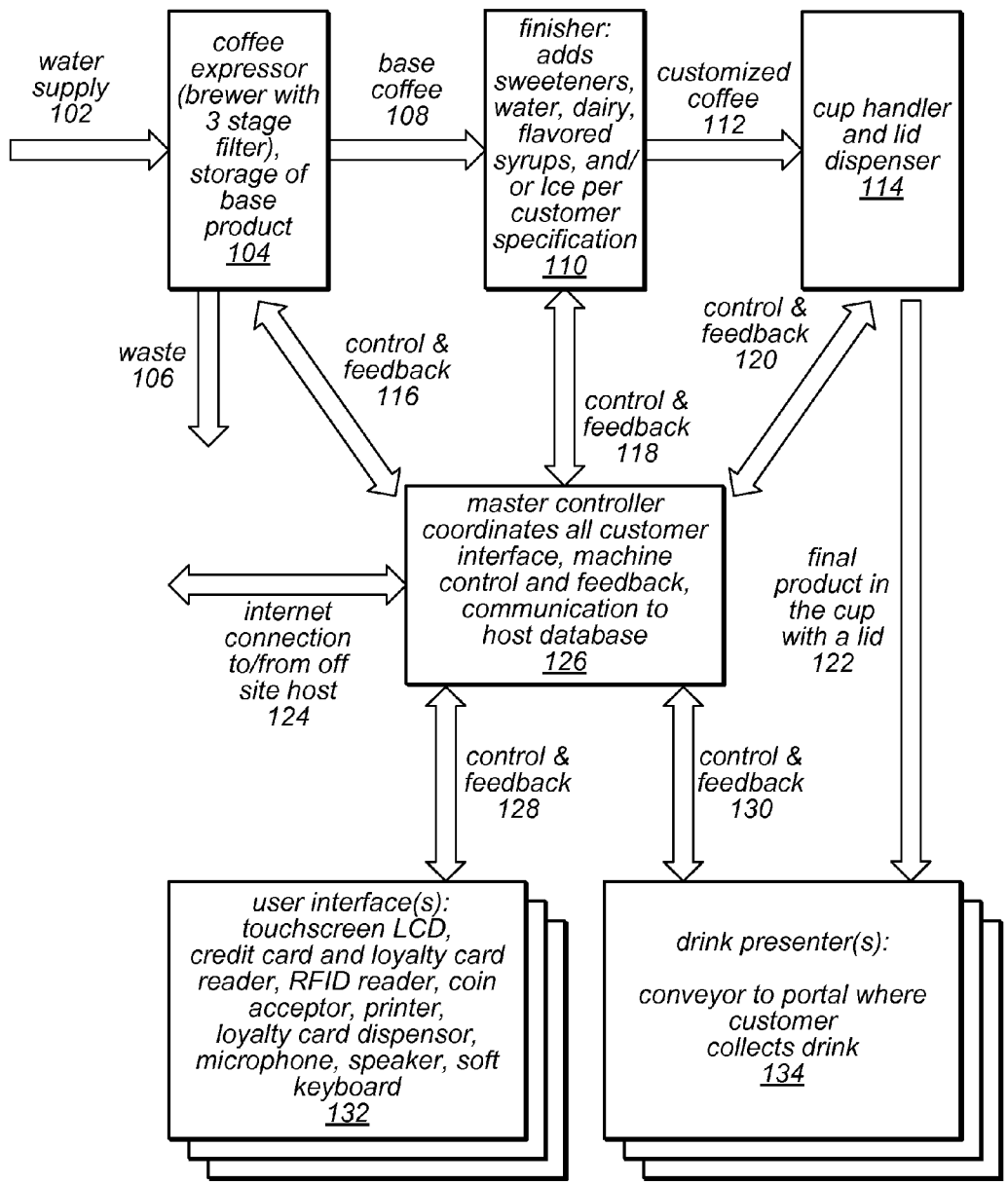
FIG. 1 illustrates a block diagram of a system for brewing and dispensing coffee, according to one embodiment.

One embodiment of a system for brewing and dispensing coffee is illustrated by the block diagram in FIG. 1. In some embodiments, the entire assembly may be housed in a stand-alone kiosk, or a walkup kiosk attached to another structure or some other housing. At a system level, various combinations of the components illustrated in FIG. 1 and other components may allow for a fully automated kiosk that goes from ground coffee or beans as an input to a fully lidded coffee cup. In other embodiments, any or all of the methods and mechanisms described here may be applied to systems located in offices that provide coffee for employees, in homes, or in other applications. They may also be applied to other applications where low overhead costs and low maintenance are priorities, but vending machine quality coffee is not sufficient.

As shown in the example illustrated in FIG. 1, the system may include a coffee expressor 104, which takes water as an input (e.g., from a water supply 102), brews coffee using a three-stage filter, and stores base coffee product. The water may be supplied directly from a city water supply, or it may be stored in a storage tank that is located such that gravity provides the flow of water to the initial filter stage (e.g., the gold filter stage). The system may also include a finisher 110, which takes the base coffee product 108 as an input and customizes the coffee product, such as by adding sweeteners, diary, flavored syrups, and/or ice, per the customer's specification. The system may also include a cup handler and lid dispenser 114, which takes the customized coffee product 112 as an input and packages it as a final product in a cup with a lid 122.

Waste produced by the system (e.g., waste produced by the coffee expressor portion of the system, shown as 106 in FIG. 1) may be directed to a city waste water service, or it may go through a screen filter stage such that only the liquid waste is directed to the city waste water service and the resulting dry waste grounds are collected when the unit is serviced. Additionally, a waste tank may be employed, e.g., when city wastewater service is not available.

As shown in the example illustrated in FIG. 1, the system may include one or more user interfaces 132. For example, user interfaces 132 may include one or more of a liquid crystal display (LCD), a touch screen LCD (e.g., a 15-inch touch screen LCD), a cathode ray tube (CRT), a plasma display, or any other display/monitor device, a credit card and loyalty card reader, a radio frequency identification (RFID) reader, a coin acceptor, a printer, a loyalty card dispenser, a microphone, a speaker, a keyboard, and/or a soft keyboard). In some embodiments, an interactive display may accept customer orders, and may interact with a master controller 126, a coin/credit card acceptor, and/or a receipt printer. In some embodiments, a gift card/reward card dispenser may be included, and may be controlled by the master controller 126. In some embodiments, multiple order entry touch screens may exist on one kiosk, and/or the main extraction and storage tank may serve multiple dispensing stations within the same kiosk. Additional displays may be employed for point of sale advertising, in some embodiments.

Other embodiments may include any or all of these user interfaces or any other user interface configured to allow a customer or technician to interact with the system. For example, the customer or technician may be prompted to input data (e.g. data indicating a selection of a function, operation, or customization to be performed, or selection of a brewed beverage to be produced) by a message displayed by the user interface mechanism. As shown in this example, the system may also include a drink presenter 134, which may provide a conveyor to a portal at which the customer may retrieve the final product (e.g., a drink).

As shown in the example illustrated in FIG. 1, the system may include a central master controller 126, which may coordinate all customer interfaces, machine controls and feedback (e.g., control and feedback illustrated at 116, 118, 128, and 130 in FIG. 1), and communication to a host server and/or database. For example, all valves, heaters, pumps, servo motors, flow control mechanisms, and/or other mechanical components of the system may controlled by the master controller, as described below. In addition, the status of any or all components of the system may be observable by a remote host through the master controller and/or an interface thereof. For example, in some embodiments, the master controller may communicate with a host server and/or database at a remote location through an Internet connection, such as that illustrated as element 124 in FIG. 1. The operations of the master controller and other components of the system are described in more detail below, according to various embodiments.

The system described herein (specifically, the coffee expressor portion of the system) may in some embodiments include a "selection box" that interrupts the flow of the extracted coffee, as described in more detail below. The selection box may also allow for automatic cleaning of the rotating initial filter. The system may include a first stage gravity filter and a second stage gravity filter or storage tank (e.g., a storage tank that also serves as a second stage gravity filter). Additional components may provide final customization and delivery of the end product.

The system described herein may use a three-stage filter process that allows the coffee to pass through the grounds at the appropriate rate using an initial gold metal filter. The coffee may then pass through two additional filter stages using gravity filters before the end product is customized as specified by the end customer with additional water, syrup, sweetener, ice, and/or dairy to create the final product for serving. A selection box may be used to cut off the flow of coffee exiting the initial gold metal filter as the brewed or "expressed" coffee enters the first gravity filter. Once in place, the selection box may redirect the flow of coffee exiting the initial gold filter into a waste container at the moment when the water has been in contact with the grounds long enough to get the maximum yield, yet before any bitter flavors begin to be extracted. This may allow for only the least-bitter "first press" coffee to enter the first gravity filter.

In some embodiments, the selection box may also serve during the cleaning cycle of the gold filter. The sliding selection box may be thought of as having a shoe box shape, and may be made of stainless steel or other non-corrosive material, with no top and no end panels, only the long sides. With the selection box located under the gold filter, the gold filter may be rotated and water jets may be sprayed at both the interior and exterior of the filter. The used grounds may flow out of the inverted filter, onto the selection box (which may be mounted at an acute angle, such as 45°), and the grounds and cleaning water may then flow into the waste container. The gold filter may be rotated back into its original position and reloaded with grounds from a container, hopper, or a grinder. This process may be repeated multiple times to fill the current gravity filter. Once the current first gravity filter is full, a rotating funnel located below the selection box may be repositioned to the next first gravity filter. That next first gravity filter may be emptied into the storage tank, its waste discarded, and that next first filter is ready for the next express (brew) cycle.

In some embodiments, the coffee may flow from the gold filter into the first gravity filter. Once in the first gravity filter, the coffee may be allowed to rest for a predetermined amount of time (e.g., for 10 minutes or longer). The first gravity filter may be a cylindrical tube, with two valves, one located at the bottom of the tube, and another that directs coffee out of the gravity filter into a vertical tube in the storage tank. The valve may be located near the bottom of the first gravity filter, e.g., a few inches from the bottom of the first gravity filter. In some embodiments, the bottom of the gravity filter may be formed in a cone shape to direct the grounds to the lowest point in the gravity filter.

During the resting period, the fine grounds suspended in the coffee may fall out of solution and rest at the bottom of the gravity filter. The coffee may be drained out of the first gravity filter into the second gravity filter, which may also be referred to as the storage tank. The drain used in the first gravity filter that is connected to the storage tank may be located near the base of the first gravity filter, e.g., a few inches above the base of the first gravity filter. After the filtered coffee is drained into the storage tank, the remaining coffee and fine grounds in the first filter may be drained to a waste container. In some embodiments, there may be a multitude of first gravity filters. For example, in one embodiment, ten first gravity filters may be used and they may form a ring around the storage tank. In such embodiments, a selection funnel may direct the coffee out of the gold filter into one of these first gravity filters. Once one gravity filter is filled, the selection funnel may be rotated to another gravity filter. That next gravity filter may be emptied into the storage tank. With its waste discarded, it may be ready to receive another batch from the gold filter. In some embodiments, it may take on the order of one minute to process coffee through the gold filter and to perform the cleaning and reloading cycles. In this example, when the gold filter is working 100% of the time, it may be able to fill ten first gravity filters and still allow each gravity filter to have ten minutes of settling time before it is emptied into the storage tank and the waste disposed. Depending on the ratio of the volume of the first gravity filter and the volume expressed through the gold filter, multiple passes through the gold filter may be needed to fill the first gravity filter. The number of first gravity filters, setting time, and cycle time may vary, in different embodiments.

Conceptually, the same process used in the first gravity filter may be applied in the second gravity filter or storage tank. The storage tank may actually provide two additional gravity filter stages: one in the entry tubes that are connected to the external first stage gravity filters, and a second one in the main body of the storage tank, where additional settling may occur. The finest of grounds may be expelled out the bottom of the storage tank, in some embodiments.

Both the first and second gravity filters may be maintained at a predetermined optimum serving temperature, such as between 120° F. and 160° F. For example, in one embodiment, the temperature may be maintained by maintaining the environment surrounding the two filters at 140° F. The indirect heating process may keep the final product from ever being in contact with heating elements that could add bitterness to the end product. This may also be achieved with blanket heaters or other indirect means, in various embodiments. In some embodiments, the temperature at which the tanks are maintained may be determined and controlled in a manner such that the system provides beverages at a suitable exit temperature, i.e. one that meets both health standards and customer acceptance standards.

As the coffee enters the second gravity filter or storage tank, it may enter a vertical tube. As it enters, the new coffee may expel the existing contents of the tube out of a valve or hole located near the bottom of the tube. The coffee that was in the tube may have had a second period (e.g., an additional ten minutes) to do an additional gravity filter operation. In one embodiment, there may be ten of these tubes inside the storage tank, and each one may be associated with one of ten first gravity filters. The tubes may contain a valve at the bottom that is opened to drain out waste and allow the tubes to serve as storage during low demand periods. The drain in the tube that allows the coffee to enter the storage tank may be located near the bottom of the tube. In some embodiments, the bottom of the tube may be located near the bottom of the storage tank so that the fine grounds do not get reintroduced to the body of the coffee stored in the storage tank. In some embodiments, the contents at the bottom of the tube may be expelled directly into the waste container.

The finest grounds that fall out of solution may rest at the bottom of the storage tank. As noted above, the bottom of the storage tank may be formed in a conical shape. At the lowest point of the cone there may be a drain valve. The drain valve may be opened periodically to allow the finest of grounds to exit the storage container, keeping them from turning the coffee in the storage tank bitter. In some embodiments, baffles may be used to minimize currents induced when releasing coffee from one gravity filter to another.

The storage tank may then contain the core product that may be customized and dispensed. It may be used as a base product in a way similar to the way espresso coffee is used as a base for many final products, such as Americano, cappuccino, etc. In some embodiments, a software program may be employed to analyze the amount of time that the coffee has been in the tank, along with historical demand data, to determine if and when the system should be flushed and new coffee introduced.

In some embodiments, a final customization step may be associated with the delivery of the end product. When the coffee is ready to be delivered, a valve located a few inches from the bottom of the storage tank may be opened to deliver the appropriate amount of coffee. The coffee may be delivered either directly into a coffee cup, or into a container where additional liquids such as additional hot water, hot milk, cold milk, sweeteners, or flavored syrups, or dried creamer, ice, or other items are added to customize the drink before delivery into the final cup, in various embodiments. The coffee cups may be manipulated by a cup handling machine such as that described in expired U.S. Pat. Nos. 4,989,753 and 5,000,345, or by any other suitable standard or custom cup handling mechanism. Once the mixture is complete, lids may be applied to the cups using a lid applicator similar to that described in expired U.S. Pat. No. 4,949,526, or by any other suitable standard or custom lid applicator mechanism.

In some embodiments, the system may support the dispensing of hot milk, either as a final product or as an ingredient in another beverage. To support hot milk dispensing, cold milk may be stored in refrigerated tanks. When needed, a valve may be open, causing the milk to flow through a preheated pipe. The pipe may have an air vent at a point elevated above the valve. As the milk flows through the heated pipe, heat may be transferred to the milk. When the milk exits the pipe, it may be at the service temperature.

Once the desired amount of milk is dispensed, the valve at the storage tank may be closed, the remaining milk may be drained from the heater pipe, and a second selection box (similar to the one used at the gold filter) may interrupt the flow of milk into the customer's cup. Once the flow is interrupted, a cleaning cycle may begin for the heater. During the cleaning cycle, hot water may be allowed to flow into the top of the heater pipe at a location very close to the milk valve. Water may be allowed to flow through the pipe and the waste may be directed away from the customer's cup. The water valve may be closed once the heater pipe is rinsed. After a period of time, the selection box may be moved back into its resting position and the heater pipe may be preheated for the next service. Note that in various embodiments, this process and equipment may be repeated/duplicated for each type of milk (e.g., whole, soy, low-fat, non-fat, etc.), or there may be multiple sources to the pipe heater, which would share one heater.

Figure 2A:
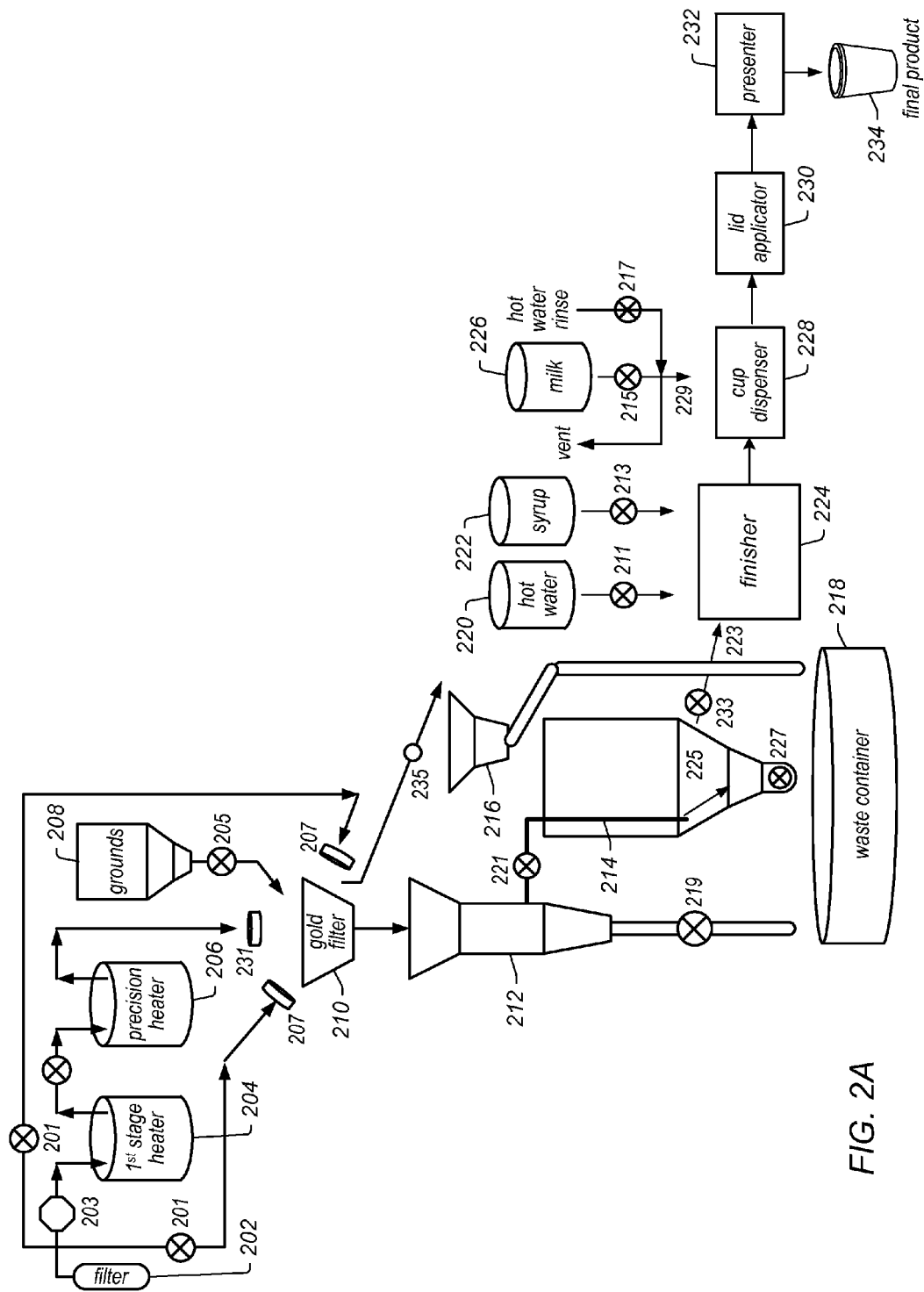
FIGS. 2A-2C illustrate the components and operation of a coffee expressor, according to one embodiment.
Figure 2B:
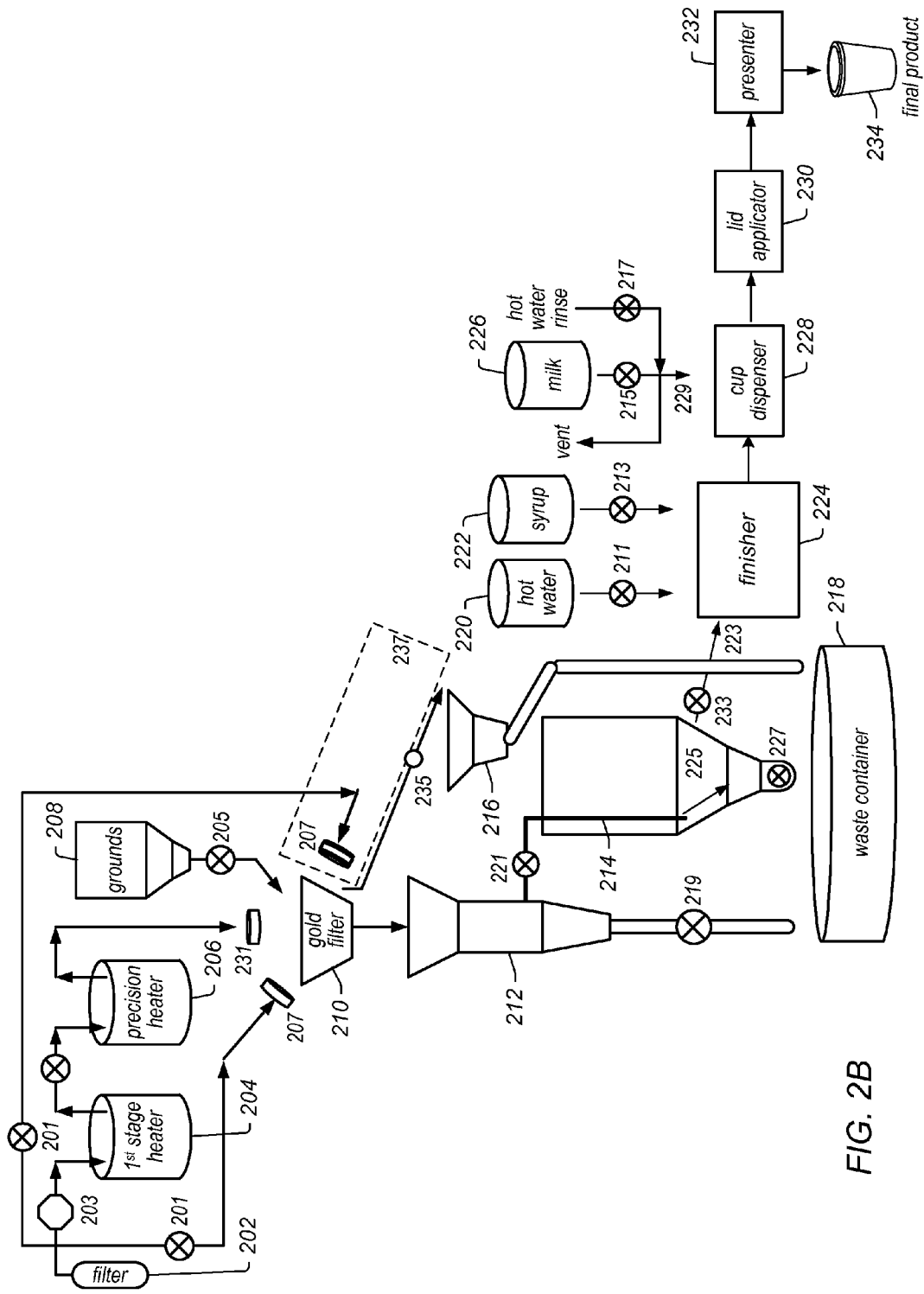
Figure 2C:
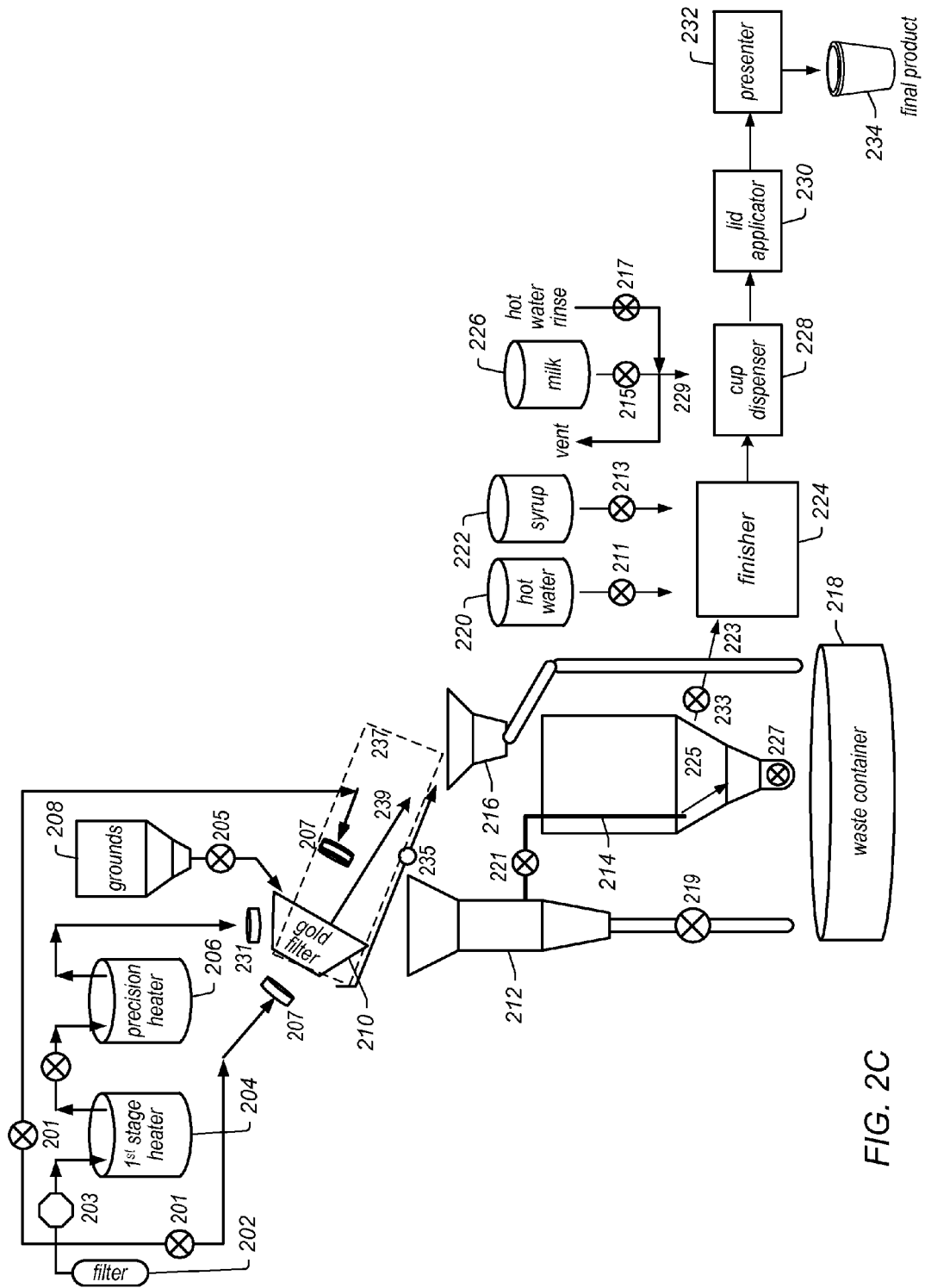

As previously noted, normally, paper filters are needed to brew coffee, but they need to be disposed of and replaced making it difficult to have a fully automated coffee kiosk. The system and methods described herein (and more specifically, the coffee expressor portion of the system) may allow for this simplification. FIGS. 2A-2C illustrate the components and operation of a coffee expressor, according to one embodiment. As illustrated in these figures, before water enters the heaters (e.g., first stage heater 204 or precision heater 206), it may go through one or more filters 202, and a pressure control valve 203. In these illustrations, one or more hoppers 208 contain ground coffee, which may be loaded into the gold filter through a valve 205. In other embodiments, they may also contain whole beans and may be integrated with or connected to a grinder in the system.

Before coffee grounds enter the gold filter, hot water may spray the filter to cause the coffee to "blume", or the coffee may be sprayed with hot water or steam as it is delivered into the filter. Another blume feature may be a rod that is inserted into the coffee grounds once the grounds are in the gold filter. Hot steam or water may be pumped into the grounds to start the blume process. The blume process may cause the coffee grounds to yield more first press coffee.

In the system illustrated in FIGS. 2A-2C, the water temperature may be controlled by using up to two heater tanks One may preheat water to an intermediate temperature (e.g., to 100° or more) before it enters the second heater tank. For example, in one embodiment, the first heater may preheat water to approximately 150° F. A second heater may take water from the first stage heater. The second heater, labeled in FIGS. 2A-2C as a precision heater, may be much smaller than the first stage heater and may operate with a faster recovery time and more finely tuned proportional/integral/derivative (PID) controller. This may provide brew water temperature within a few degrees of a predetermined optimum temperature. The final optimum temperature output from the precision heater may be in the range of 180° F.-210° F. In one embodiment, it may be set at 192° F. While the example illustrated in FIGS. 2A-2C includes two heaters, in other embodiments, the system may have only a single precision heater.

During the first stage of the gold filter expression process, the gold filter 210 may be vibrated or rotated slightly to accelerate the flow of the water through the gold filter. Any of the gravity filters 212 and 225 (which may in some embodiments be sintered stainless steel filters having a specific porosity that regulates the flow of water through the coffee) may also have vibrators to accelerate the rate at which the fine grounds exit suspension, in some embodiments. In some embodiments, loosening up the mixture of grounds and water in a filter by vibrating the filter may accelerate the rate of the water flow through the filter and/or may accelerate the blume process. This may result in a more efficient extraction of the coffee and the use of a smaller portion of the grounds for each cup. In some embodiments, ultrasonic technology may be used to vibrate one or more of the filters or other components of the system, and the water or water/grounds mixture in those components (by transmission of the ultrasonic vibrations from these components to the water or water/grounds, creating bubbles that expand and contract at a high rate. In some embodiments, an ultrasonic mechanism may be used to back-flow and clean one of the filters (e.g., a stainless steel filter), and at the same time may be used in the brewing process to clean the coffee grinds. In such embodiments, the mechanical action of the bubbles may do the work of cleaning the coffee grinds and/or accelerating the extraction of the coffee from the grinds.

The determination of the exact time at which the selection box 237 interrupts the gold filter expression stage may be determined by a timer, a flow monitor that determines that a particular volume of water as passed, or by an optical device that determines the degree at which light passes through the expressed coffee exiting the filter, or by other means.

The coffee storage tank 225 may also be outfitted with a plunger that effectively reduces the volume of the storage tank during lower demand periods. This may minimize waste and the amount of time coffee must be in the second filter during lower demand periods. During high demand times, the plunger may be removed from the second filter, increasing the quantity of coffee ready to be dispensed. Alternately, the individual tubes within the storage tank 225 may act as second stage gravity filters and during low demand periods, their output may be directed directly out to the final product stage for customization.

The operation of the coffee expressor illustrated in FIGS. 2A-2C may be described as follows. Coffee is expressed in small quantities and filtered three times: first with a gold filter 210, then using gravity in a first gravity filter 212, and a third time in the second stage filter (storage tank) 225. The two gravity filters remove the finest of the grounds. Coffee is brewed through the gold filter 210 and allowed to sit in the first gravity filter 212 for a predefined resting period (e.g., 10 minutes). As previously noted, the system may include a plurality of gravity filters 212, which are not shown in these diagrams. Also not shown is a rotating funnel that may be used to direct the brewed coffee exiting gold filter 210 into one of the plurality of second stage filters 212. In one embodiment, the coffee expressor may include ten gravity filters 212 positioned around the circumference of a single second stage filter (storage tank) 225.

The cycle time for the expression through gold filter may be on the order of one minute. Therefore, with ten first gravity filters 212, the gold filter 210 may be fully utilized while allowing a 10 minute filter time in each of the first stage gravity filters 212, in this example. In this example, after 10 minutes filter time in a particular first stage filter, electromechanical valve 221 may be opened by the master controller and the brewed and filtered coffee may be drained from filter 212 into the corresponding tube 214 inside the second gravity filter (storage tank) 225. After the first stage gravity filter 212 is emptied into the second stage filter (storage tank) 225, valve 221 may be closed, and valve 219 may be opened to drain the waste grounds into either a waste storage tank 218, or through a drain to the public waste water system. In this example, valve 227 may be opened periodically for a brief moment to allow any residual grounds that have settled to the bottom of second stage filter 225 to be expelled into the waste storage tank 218 or the public waste water system.

In the example illustrated in FIGS. 2A-2C, valve 233 may be opened by the master controller when it is time to deliver brewed and filtered coffee (i.e., "Expressed Coffee") 223 to the customer and/or to customize it with additional hot water, milk, sweeteners, syrups, etc. at the finisher 224. Note that while FIGS. 2A-2C illustrate hot water and syrup being introduced to beverage at the finisher 224 and hot milk being introduced at the cup dispenser 228, in other embodiments any of these or other additives may be introduced at either stage. In this example, a cup dispenser 228 and lid applicator 230 may be used to manage the cups and lids and deliver the product to the customer, e.g., at presenter 232. FIG. 2B illustrates the position of selection box 237 during a brewing cycle. In this example, the master controller controls servo motor 235, which positions the selection box 237 in this or its cleaning cycle position, as described below.

The coffee expressor illustrated in FIGS. 2A-2C may include other items not shown, in various embodiments. For example, the system may include a steam vent that injects steam into the grounds before the expression process starts to "blume" the coffee. In such embodiments, the coffee may be blumed for several seconds before water is applied to the gold filter 210. This may enhance the Expression process.

As described above, the system may support the dispensing of hot milk. In such embodiments, the system may include a heater pipe and a second selection box that is used to heat milk or similar liquids (not shown). When the second selection box is in its resting position, hot milk 229 may be directed into the end user's coffee cup, in some embodiments. In other embodiments, hot milk 229 may be directed to the finisher 224 for mixing with the coffee before the coffee mixture is passed to the cup dispenser 228. Once the proper amount of milk is dispensed, the second selection box may be repositioned to interrupt the flow and the remaining milk may be directed to the waste container 218. Hot water may then be passed through the heater pipe to clean out the heater pipe. The waste hot water may be directed by the second selection box to the waste container 218 and eventually the selection box may be returned to its resting position, ready for the next cycle. In some embodiments, the customized end product may be heated in the finisher 224 (e.g., with hot steam) before it is delivered to the cup dispenser 228 (not shown).

FIG. 2C illustrates the system once the grounds in gold filter 210 are used. Once the original Expression process is complete (e.g., after something on the order of 20 seconds), the master controller may activate servo motor 235 to move the selection box 237 from its resting position up to the left so that it is resting below gold filter 210. This may cut off the flow of brewed coffee into the first stage gravity filter. In this way, only the least bitter, initial expression may be allowed into the final product. Therefore, in some embodiments, the system and methods described herein prevent otherwise bitter coffee results. Once selection box 237 is in the left position (i.e., the cleaning cycle position), the brewed coffee may begin to drain into the waste container 218 or the public waste water system. During the cleaning cycle, gold filter 210 may be rotated by an amount greater than 90° (e.g., 270°) one or more times (e.g., twice) with a servo motor controlled by the master controller in order to dislodge and/or expel its contents. At the same time, the master controller may open valves 201 and clean water may be sprayed from multiple angles and spray heads at the rotating gold filter 210. This may clean the waste grounds 239 and cleaning water out of filter 210 and direct them to the waste container 218 or public waste water system through tube 216 (illustrated in FIGS. 2A-2C as having a front-end funnel). The master controller may then control repositioning of the selection box 237 to the right and rotating the gold filter 210 upright, so that they are ready for the next brew cycle. as shown in the example illustrated in FIGS. 2A-2C, the system may include one spray head 231 for introducing heated water into gold filter 210 to produce a beverage, and two cleaner spray heads 207, although other numbers and types of spray heads may be included in these and other positions, in other embodiments. In some embodiments, the system may include one or more screens to catch grounds (e.g., at valve 227, in waste container 218, and/or following valve 219).

In various embodiments, the master controller may control all servos and valves, such as those illustrated in FIGS. 2A-2C, and various sensors of the system. The master controller may also be configured to receive and analyze data collected by these sensors to determine the state of the machine, raw material volumes on hand, current activity, etc. This data may be periodically (or on demand) uploaded by the master controller to a host server that presents data on a multitude of machines to the operator. For example, the master controller may be configured to monitor weights in containers, monitor temperatures, control heating elements, check for faults, control a touch screen interface, and communicate through the Internet or by phone to report status and to communicate alerts to a host computer. The master controller may also be configured to accept queries from the host and/or to validates credit cards and gift cards through interaction with a host database, in some embodiments. In various embodiments, additional levels of hierarchy may be implemented such that different hosts may be configured to communicate with various subsets of all operating systems. For example, there may be one host server configured to communicate with multiple instances of the coffee brewing system in a particular region, or associated with a given operator, or having any other common attribute(s). A plurality of such host servers may be configured to communicate with a central host (e.g., a company-wide host server), in some embodiments.

Figure 3:
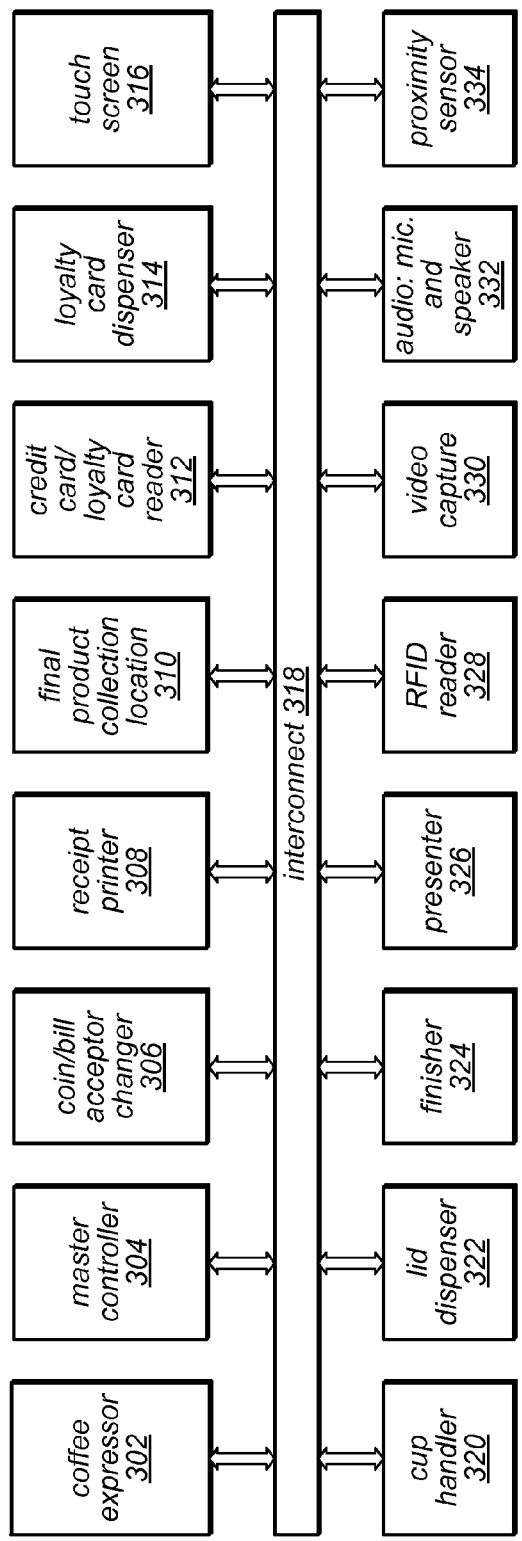
FIG. 3 illustrates various interconnected components of a system for brewing and dispensing coffee, according to one embodiment.

FIG. 3 illustrates various interconnected components of the system described herein, according to one embodiment. In this example, all of the illustrated components, many of which are described herein, are connected to a central interconnect 318 (e.g., a communication bus). It is through this interconnect that the master controller 304 may receive feedback and other inputs from the other components of the system (e.g., coffee expressor 302, cup handler 320, lid dispenser 322, finisher 324, presenter 326, and/or final product collection location 310) and may issue commands (e.g., in the form of machine instructions or signal values) to those components. In various embodiments, one or more user interfaces, such as a touch screen 316, proximity sensor 334, audio interface 332 (including a microphone and/or speaker), video capture device 330, RFID reader 328, receipt printer 308, coin/bill acceptor/changer 306, credit card/loyalty card reader 312, and/or loyalty card dispenser 314, may provide a customer interface and/or maintenance interface, as controlled by the master controller 304. While the master controller 304 is illustrated as a single component in FIG. 3, in some embodiments, the functionality of the master controller described herein may be partitioned between two or more components that together provide this functionality. For example, in some embodiments, the master controller may include a separable motor and/or valve controller that is dedicated to controlling the valves, motors, and other mechanical elements of the system. This separable component may include trim controllers, for example. Various functions of the master controller may be implemented by hardware, software, or by a combination of hardware and software, in various embodiments.

In some embodiments, the system described herein may be configured to support various business processes. For example, a customer loyalty process may be employed whereby the customer purchases a loyalty "debit card". The unique id of the debit card once inserted in the system (and read by a loyalty card reader) may be compared to a central database (e.g., on a remote host system). For example, in some embodiments, a plurality of kiosks may be configured to communicate with a central database on a remote host system and to store information in the central database and/or retrieve information from the central database to share customer profile information (e.g., customer-specific preferences and purchase histories) between the kiosks. In one embodiment, the previous "n" purchases from the debit card may be displayed with each drink's customization (i.e. drink type, quantity of syrup, sweetener type and quantity, dairy additive and quantity) and cost along with the value left on the debit card. In some embodiments, the loyalty cards may also be dispensed and/or refilled at the system and may double as gift cards. Loyalty cards may also be refilled online, in some embodiments.

In some embodiments, customers having loyalty cards may be able to share their favorite drink combination with their friends. In such embodiments, each loyalty debit card may be associated with customer identifier and/or another identifier of a user account, e.g., an email account/address. Users may be able to login into a web site hosted by the central server from home or their cell phone. From there, among other things, they may view their recent purchases, give a name to any of their recent orders, and then forward their "drink file" (named for example drinkname.exc) to friends either by email, to a phone, or through a social networking sites. In some embodiments, the host system may track the distribution and/or reuse of customers' drink recipes, and rewards (e.g., free drinks) may be awarded to creators of highly used recipes. In some embodiments, the files in which drink recipes are stored may adhere to a particular file format, and/or the contents of those files (the recipes) may follow a particular syntax for specifying drink recipes (e.g., a file format and/or syntax readable by the master controller).

In some embodiments, messages may be delivered to customers during the customization and product delivery time. These messages may follow standard story boards, and may be customized for the individual customer. The system may be configured to deliver a sequence of messages, and the last step in that sequence that was displayed to the customer may be stored each time the customer visited any of the kiosks. For example, an indicator of the last message displayed may be thought of as a "bookmark" in the corresponding story board. Such a bookmark indicator may be stored in profile data associated with the customer to indicate the point in the sequence at which the most recent interaction with the customer ended. In such embodiments, each time the customer visits one of the kiosks, they may receive new information that is in context with the previous information that they received (e.g., that begins at the point of a previously stored bookmark indicator), or in the context of a previous or current drink order (e.g., dependent on the drink recipe, drink customizations, or other options selected by the customer when visiting the kiosk). The information may also be tailored based on the particular tastes of the customer. In some embodiments, philanthropic choices may be presented to the customer, i.e. to select one of "n" non-profits that they would wish to be supported on their behalf. For example, the screen may display the names and/or logos of ten non-profits being supported in the month. The customer may be able to select one or more and be presented with information about them (e.g., by selecting an active link displayed within a message on a touch screen). Active links may also be used in other messages (e.g., advertising messages or other types of story boards) to allow the customer to access additional information according to their preferences. These choices may lead to further tailoring of the message(s) presented to the customer on this or another visit.

Figure 4:
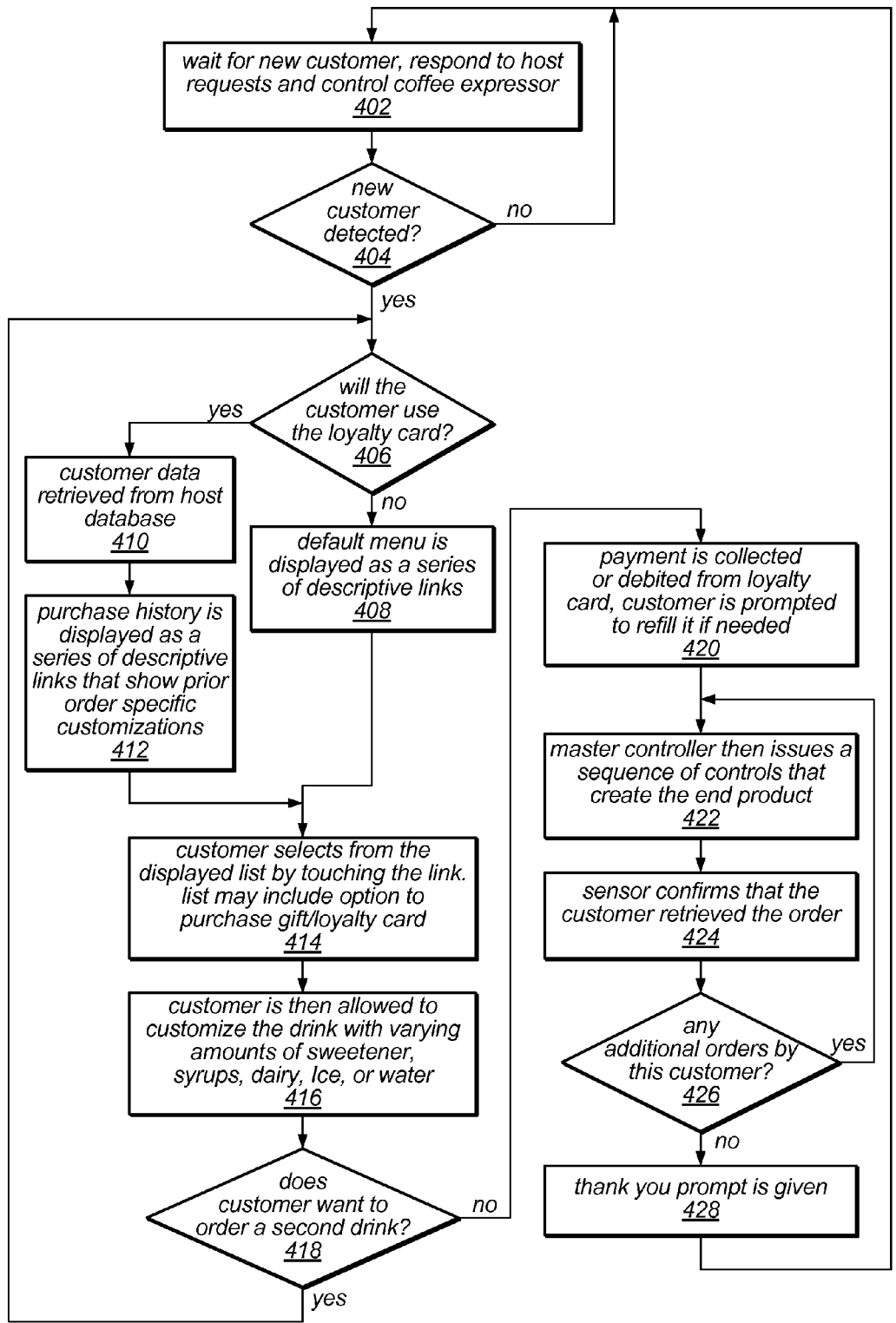
FIG. 4 is a flow diagram illustrating one embodiment of a method for providing beverages to a customer, as described herein.

One method for providing beverages to a customer is illustrated by the flow diagram in FIG. 4, according to one embodiment. As illustrated at 402, in this example, the system may respond to host requests and control the coffee expressor while waiting for a new customer (shown as the feedback loop from the negative exit of 404 to 402). When a customer is detected, shown as the positive exit from 404, the system may prompt the customer to insert a loyalty card if it is not already inserted. If the customer will use a loyalty card, shown as the positive exit from 406, the system may retrieve customer data from database on the host server, as in 410. For example, the system may read the card identification number, and send the card number to the host server. The host may respond by sending the customer's recent purchase history and card balance. The purchase history may then be displayed on an LCD or another display device as a series (or list) of descriptive links (as in 412), and each of the links may show specific drink customizations made by the customer in a prior order. In some embodiments, the inventory may be checked by the master controller to make sure that the beverage corresponding to each link can be produced. If not, the user may be warned that a particular selection is not available.

In some embodiments, the master controller may be configured to determine one or more alternate drink recipes (e.g., standard, custom, or new drink recipes) to be suggested or recommended to the customer (e.g., by displaying these options on the screen) based, for example, on stored customer profile information for the customer, drink preferences of customers with similar customer profiles, popularity of drink recipes, or recommendations from friends of the customer. In some embodiments, the master controller may be configured to select alternate drink recipes to be suggested or recommended to the customer based on the collective preferences of customers who visit the kiosk (e.g., based on the most frequently ordered drinks or customizations selected) or the collective preferences of all or any subset of customers whose profiles are stored together in a shared database accessible to the master controller. As illustrated at 414 in FIG. 4, in some embodiments, the customer may touch an intuitive link in the list displayed on the touch screen that describes a previously ordered beverage (or group of beverages) that the customer would like to order again. In various embodiments, the user may select one of the links (e.g., to order a favorite drink), select an option to enter a new order (e.g., by choosing a different drink from a standard or default menu, or creating a new recipe by customizing a selection from a standard or default menu), or cancel the transaction. If the customer is not using a loyalty card, shown as the negative exit from 406, a default menu of available drinks may be displayed as a series of descriptive links, as shown in 408.

As shown in 416 of FIG. 4, once a link has been pressed, the selected link may be highlighted and a display may prompt the customer to indicate whether they would like to further customize the order, or accept the same options as last time. If they choose to customize the drink, a new screen may be presented graphically showing the selection and customization options. For example, slider bars presented on a touch screen may indicate current, prior, default, minimum, and/or maximum levels of strength, sweeteners, flavoring, and other customizable options for a selected drink, along with their costs, and various drink customizations may be selected by changing the position of one or more sliders on their respective slider bars. In some embodiments, an addition user interface mechanism (e.g., a radio button) may be selected in order to override a default, minimum, or maximum setting for a customizable option. Selecting a "back" button may allow the customer to go back to the list drinks and/or customization options. In some embodiments, the customer may also be prompted to indicate whether they would like to order another drink, as in 418. If so, shown as the positive exit from 418 and the feedback loop to 406, any or all of the selection and/or customization steps described above may be repeated for one or more additional drinks. In some embodiments the user may be prompted to confirm the drink or drinks that have been selected and/or customized. For example, a button on the touch screen may be pressed by the customer to confirm that the drink (or drinks) should be produced.

In the example illustrated in FIG. 4, once the customer has confirmed the selection of one or more drinks, the price of the selected drink(s) may be displayed and the customer may be prompted for payment method desired, and payment may be collected, as in 420. In some embodiments, benefits of the loyalty debit card may also be displayed. In this example, the payment process may be completed by paying with a credit card, debit card, or cash, or the loyalty debit card value may be reduced by the appropriate amount for the selected drink(s). In other embodiments, the customer may select a third party web-based payment service (e.g., a payment service provided by PayPal, Inc.) through which to make payment. In such embodiment, the user interface mechanism may be configured to prompt the customer to input account information for the payment service or to navigate to a login screen for that service in order for the customer to complete the payment process. As illustrated in FIG. 4, if the loyalty card value is not sufficient to cover the order, the user may be prompted to add money to the card. For example, in one embodiment, if the loyalty card balance is or will be below a pre-set minimum threshold (e.g., $2.00) after a drink purchase, the customer may be prompted to indicate whether they would like to refill it now or set up an automatic refill of the debit card based on a credit card on file for the customer's account.

In the example illustrated in FIG. 4, once the order is placed, a master controller (such as that described herein) may issue a sequence of controls that create the end product (i.e. the selected drink or drinks), as in 422. In some embodiments, a processing screen may be presented displaying one or more message while the selected drink or drinks are being produced. In some embodiments, one or more messages (e.g., the story boards and/or non-profit information described above) may be presented to the user while the order is being processed. In some embodiments, selected drink parameters may be sent to the drink fulfillment controller (i.e. the master controller) and the processing screen may display the progress of the order fulfillment operation. Once order fulfillment is completed, the user may be prompted to take the drink and to be careful. The storage tank temperature may be read and the exact temperature may be displayed to show the customer the drink temperature. In some embodiments, the presenter 134 or 232 may be configured to label the cup with the customer's name, a recipe name, the customization contents (i.e. drink recipe), one or more standard or personalized messages or advertisements, a receipt for the cost of the drink, and/or any other information in text or graphics. Once a sensor detects that the cup has been taken, confirming that the customer has retrieved the order (as in 424), a "Thank you!" prompt may be displayed, as in 428. In various embodiments, the customer may be prompted to indicate whether they would like to order another drink, add money to their loyalty card, purchase an additional card as a gift card, and/or print a receipt and take their card. In some embodiments, if the customer has ordered multiple drinks, shown as the positive exit from 426, the operations illustrated in 422-426 may be repeated to produce and dispense all of the selected drinks. This is illustrated as the feedback loop to 422. If there were no other drinks ordered by this customer, shown as the negative exit from 428, the system may return to waiting for (another) new customer, as illustrated by the feedback loop to 402, in this example.

In some embodiments, the process described above may be invoked in response to sensing an RFID tag on the customer to obtain the unique identifier (customer ID) of the customer. In response to detecting the RFID, the system may prompt the customer to enter a PIN to continue the process of ordering. In other embodiments, a customer may be detected by a proximity sensor or by a touch on an LCD touch screen. In some embodiments, a "Welcome Screen" may be display offering options in response to detection of a new customer. The system may be configured to determine that the customer elects to use a loyalty Debit Card in response to the customer inserting the card or selecting a button indicating this intent. In some embodiments, the system may be configured to accept payment from a mobile phone application.

Figure 5:
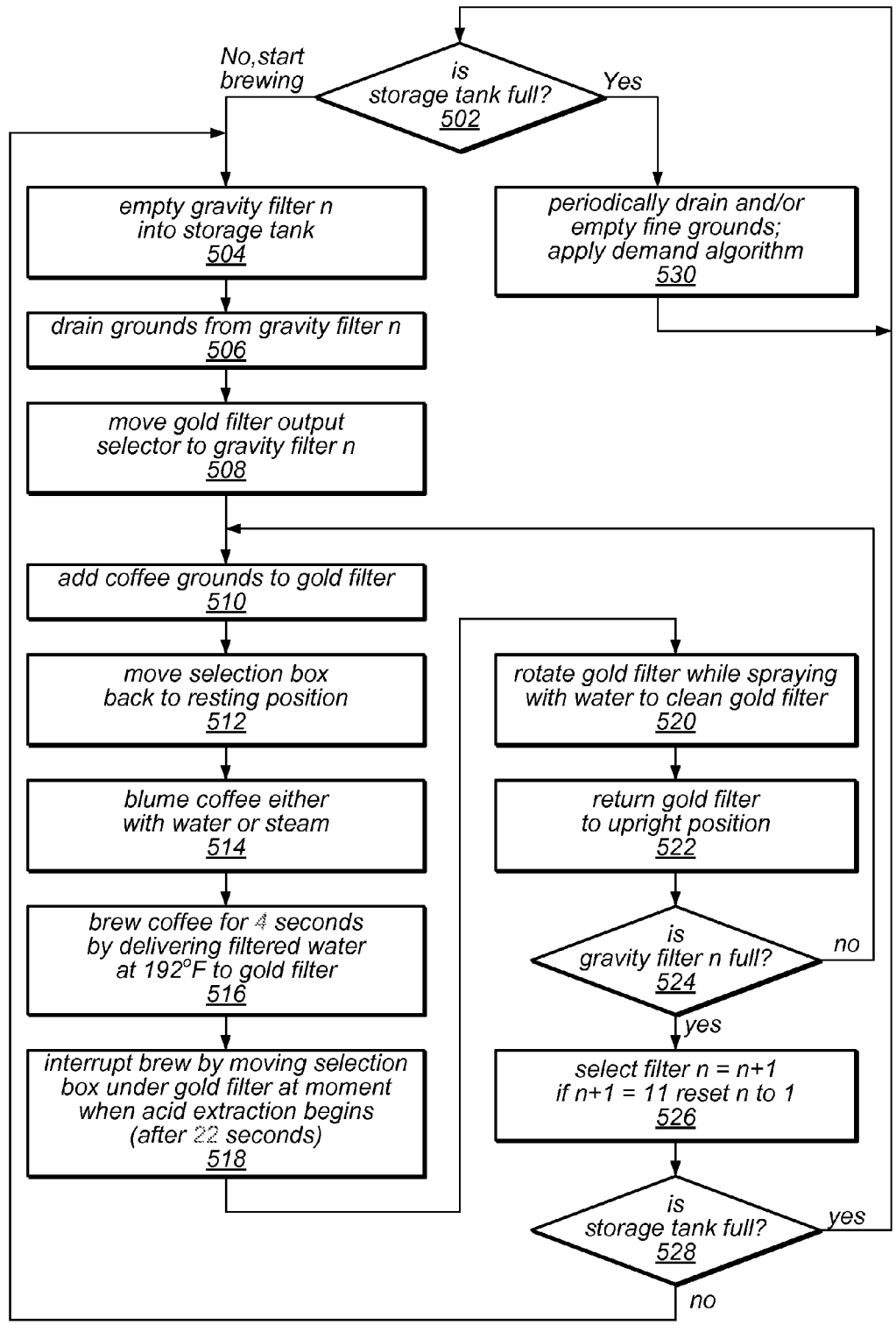
FIG. 5 is a flow diagram illustrating one embodiment of a method for controlling a system brewing and dispensing coffee, as described herein.

FIG. 5 illustrates one embodiment of a method for controlling a system that brews and dispenses coffee, as described herein. This method is largely described above, as it is applied to the coffee expression mechanisms illustrated in FIGS. 2A-2C. In the example illustrated in FIG. 5, it may be assumed that there are N first stage gravity filters in the system. As described above, the master controller may be configured to control various valves and servos, and to receive inputs from sensors and user interfaces to cause the system to produce the specified drink. Thus, the operations described in FIG. 5 may be controlled by such a master controller, in some embodiments.

As illustrated this example, if the storage tank is not full, shown as the negative exit from 502, the method may include emptying a gravity filter n into the storage tank to begin the brewing process, as in 504. The method may then include draining grounds from gravity filter n (as in 506) and moving a gold filter output selector to gravity filter n (as in 508). As illustrated in this example, the method may also include adding coffee grounds to the gold filter (as in 510) and moving the selection box to its resting position (shown as 512), as described above.

In this example, the method may include bluming the coffee with water and/or steam, as in 514, and brewing the coffee for a predetermined number of seconds (4 seconds, in this example) by delivering filtered water at 192° F. to the gold filter (as in 516). In some embodiments, the method may also include interrupting the brewing process by moving the selection box under the gold filter at the moment at which acid extraction begins (after 22 seconds, in this example). This is shown at 518 in FIG. 5. As described above, the method may also include rotating the gold filter while spraying it with water to clean the gold filter (as in 520) and then returning the gold filter to its upright position (as in 522).

In the example illustrated in FIG. 5, if the gravity filter n is not full, shown as the negative exit from 524, the method may include repeating the operations illustrated in 510-524 using gravity filter n. If the gravity filter n is full, shown as the positive exit from 524, the method may include selecting the next gravity filter (filter n+1) for use, as in 526. In one example, if there are ten first state gravity filters, then if n+1=11, the first gravity filter may again be selected for use (e.g. the system may select filter n, where n=1). Is illustrated in FIG. 5, if the storage tank is full, shown as the positive exit from 528, the method may include repeating some of the operations illustrated in FIG. 5, which may include those illustrated in 530. This is shown as the feedback loop from 528 to 502. If not, shown as the negative exit from 528, the method may include initiating the brewing process again, beginning at 504. This is illustrated in FIG. 5 by the feedback loop from 528 to 504.

As illustrated at 530 in this example, the method may include opening the bottom valve periodically (e.g., every 15 minutes) to drain fine grounds from the storage tank (the second gravity filter). In this example, the method may also include periodically emptying the fine grounds from the gravity filters sequentially (e.g., every ten minutes). In some embodiments, a demand algorithm may be applied, as illustrated in 530. In some embodiments, a demand algorithm (e.g., implemented as program instructions executing on a processor in the master controller) may be configured to determine if full drainage of the storage tank is required or if the coffee should be held in the internal tubes and/or plunger deployed for low demand periods. Note that, depending on the capacity of a gravity filter n, there may be multiple expression cycles through the gold filter before moving on to gravity filter n+1. As previously noted, in some embodiments, the method may include moistening the coffee "blume" with a steam probe before the expression process begins.

Figure 6:
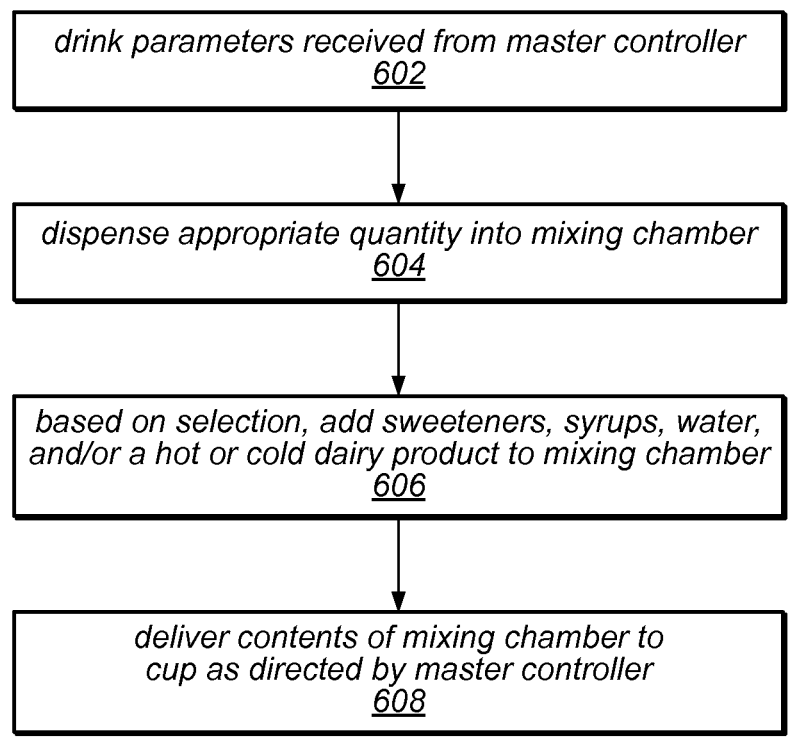
FIG. 6 is a flow diagram illustrating one embodiment of a method for finishing a beverage customization, as described herein.

FIG. 6 is a flow diagram illustrating one embodiment of a method for finishing a beverage customization, as described herein. For example, the method illustrated in FIG. 6 may be performed by the system disclosed herein or by another system configured to perform the operations illustrated therein. As illustrated in this example, the method may include receiving drink parameters from a master controller, as in 602, and, in response, dispensing an appropriate quantity of the beverage into a mixing chamber, as in 604. As illustrated in this example, the method may also include adding one or more sweeteners or syrups, water, and/or a hot or cold dairy product (e.g., cream, whole milk, half-and-half, low-fat milk, or non-fat milk) to the mixing chamber, based on the selections indicated by the received drink parameters, as in 606. Finally, as illustrated in 608, the method may include delivering the contents of the mixing chamber to a cup, as directed by the master controller Note that in some embodiments, the customer may wish to use their own cup. In this case they may be asked to insert the cup into the machine (e.g., the customer may be prompted to insert the cup by a message displayed by the user interface mechanism). In some such embodiments, the customer may be prompted to indicate the container size (e.g., using the user interface mechanism) and the system may be configured to dispense an appropriate quantity of a selected beverage for the size of the cup. The system may prepare and present the drink according to drink parameters received from the master controller (e.g., in response to various user inputs). In some embodiments, the system may be configured to deliver the selected beverage as long as the touch screen button is pressed. Data indicating the volume delivered may then be stored on the loyalty card database and made available for use on the next order.

Figure 7:
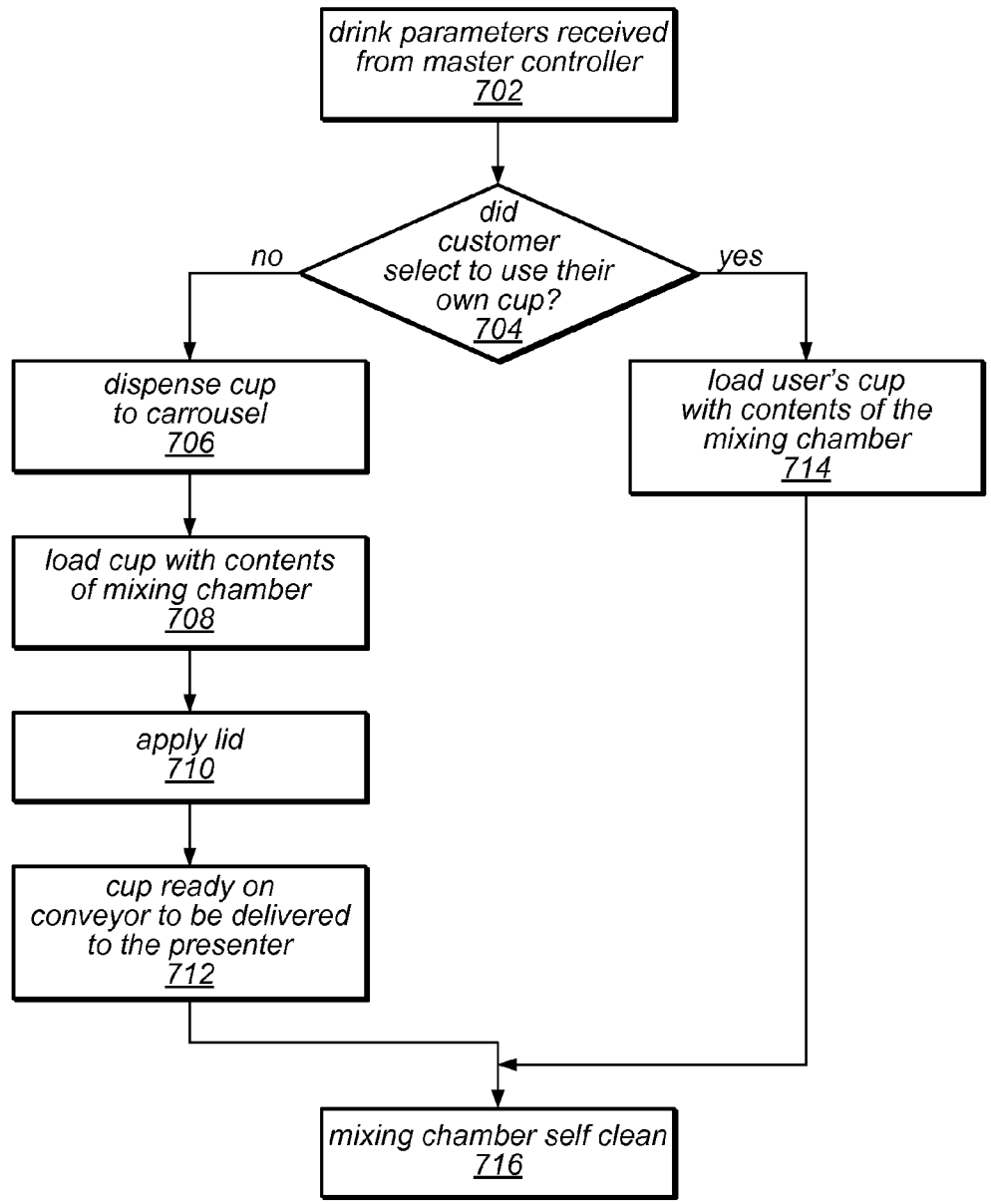
FIG. 7 is a flow diagram illustrating one embodiment of a method for dispensing a beverage, as described herein.

FIG. 7 is a flow diagram illustrating one embodiment of a method for dispensing a beverage, as described herein. As illustrated in this example, in some embodiments the method may include receiving drink parameters from a master controller, as in 702. If the drink parameters indicate that the user has selected to use their own cup, shown as the positive exit from 704, the method may include loading the user's cup with the contents of the mixing chamber, as in 714. For example, the mixing chamber may contain a beverage that has been customized by the finished according to one or more customer-specified drink parameters, as described herein.

If the customer did not indicate that they would use their own cup, shown as the negative exit from 704, the method may include dispensing a cup to a carrousel, as in 706, and loading the cup with the contents of the mixing chamber, as in 708. In some embodiments, the method may include applying a lid to the cup, as in 710, and placing the cup on a conveyor belt, ready to be delivered to the presenter, as in 712. In some embodiments, after the contents of the mixing chamber have been dispensed into a cup provided by the system or the user's cup, the method may include the mixing chamber performing a self-cleaning operation, as in 716.

Figure 8:
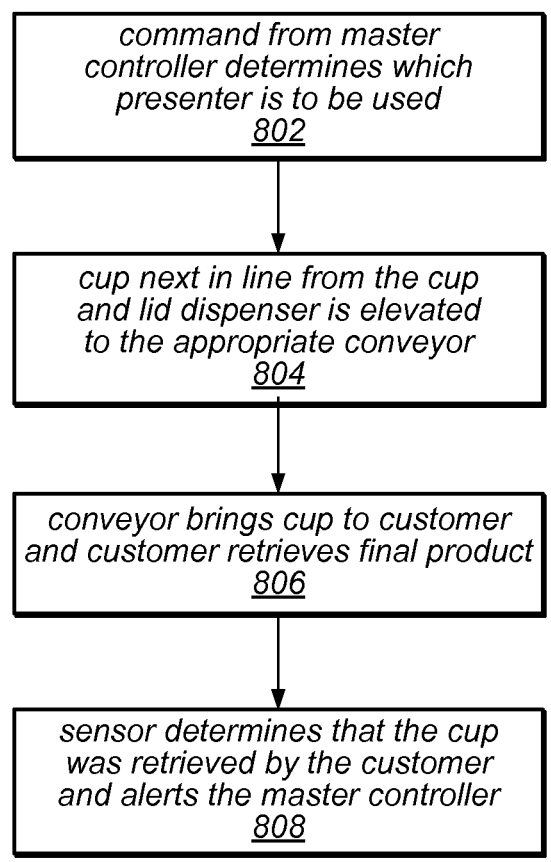
FIG. 8 is a flow diagram illustrating one embodiment of method for presenting a beverage to a customer, as described herein.

FIG. 8 is a flow diagram illustrating one embodiment of method for presenting a beverage to a customer, as described herein. In this example, it is assumed that the system includes multiple presenters 134 or 232 for conveying the final product to the customer. As illustrated at 802, in this example, the method may include determining which presenter is to be used dependent on a command from the master controller. In some embodiments, the method may include elevating the next cup in line from the cup and lid dispenser to the appropriate conveyor, as in 804. As illustrated at 806 in FIG. 8, the method may include the conveyor bringing the cup to the customer and the customer retrieving the final product. In some embodiments, the method may include a sensor determining if and when the cup was retrieved by the customer and alerting the master controller, as in 808.

In some embodiments, a soft keyboard may be available for use in capturing a customer's email address when they purchase or use a loyalty card. Comments and feedback may be captured orally (e.g., via a microphone) and stored and transmitted digitally back to the host computer. Video capture and security may also be tied into the master controller and may be observable by the master controller and/or remotely. For example, in some embodiments, video images and/or other security data (e.g., evidence of attempts to break into or otherwise tamper with the kiosk) may be communicated to and monitored by a remote server. In some embodiments, a video capture device may capture an image that is input to a face recognition mechanism to identify the customer. In still other embodiments, a user interface mechanism comprising a touch screen or an optical, ultrasonic, or capacitance sensor may be configured to capture a customer's fingerprint that is input to a fingerprint identification mechanism to identify the customer. In some embodiments, the design of the kiosk itself may resemble or have design components that suggest an Italian Espresso machine.

Figure 9:
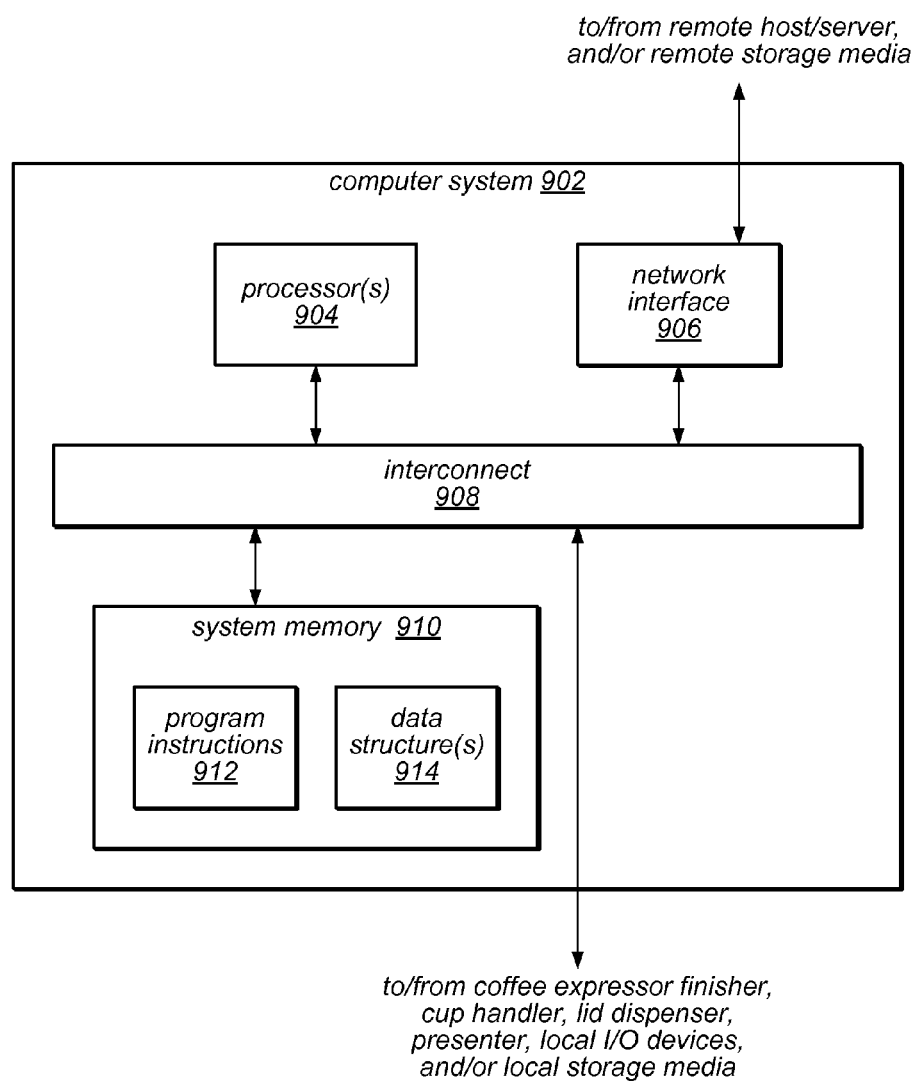
FIG. 9 is a block diagram of a computer system configured to control a system for brewing and dispensing coffee, according to one embodiment.

The methods described herein for controlling a coffee brewing and dispensing system may be implemented by a computer system configured to provide the functionality described. FIG. 9 is a block diagram illustrating one embodiment of a computer system 902 configured to implement one such master controller. In various embodiments, computer system 902 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, a standard or custom embedded controller, a standard or custom microcontroller-based system, or in general any type of computing device. In the example illustrated in FIG. 9, computer system 902 may be located in the same physical location as other components of the system (e.g., the coffee expressor, finisher 110 or 224, cup handler and lid dispenser 114 (which may include one or more carrousels on which cups and/or lids conveyed to be placed in position for use), presenter 134 or 232, and various input/output devices). In other embodiments, all or a portion of computer system 902 may be implemented as a remote host or server configured to communicate with the rest of the system through one or more communication interfaces. For example, in some embodiments, all or a portion of the master controller may be implemented on a remote host, rather than being implemented on a computer system physically located within an individual expressed coffee kiosk.

As illustrated in FIG. 9, computer system 902 may include one or more processor units (CPUs) 904. Processors 904 may be implemented using any desired architecture or chip set, such as an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 902, such as various versions of Unix, Linux, Windows™ from Microsoft Corporation, MacOS™ from Apple Corporation, or any other operating system that enables the operation of software on a hardware platform.

The computer system 902 may also include one or more system memories 910 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 902 via interconnect 908. Memory 910 may include other types of memory as well, or combinations thereof. One or more of memories 910 may include program instructions 912 executable by one or more of processors 904 to implement aspects of the techniques described herein. Program instructions 912 may be implemented in various embodiments using any desired programming language, scripting language, or combination of programming languages and/or scripting languages, e.g., C, C++, C#, Java™, Perl, etc.

Program instructions 912 may be partly or fully resident within the memory 910 of computer system 902 at any point in time. All or a portion of program instructions 912 may be stored on an external storage device (not shown) accessible by the processor(s) 904, in some embodiments. Any of a variety of such storage devices may be used to store the program instructions 912 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 904 through one or more storage or I/O interfaces including, but not limited to, interconnect 908 or network interface 906, as described herein. Memory 910 may also be configured to implement one or more data structures 914, such as one or more data structures configured to store drink recipes; advertisements, story boards, and other messages; status information for the system; inventory information for the system; an order log or purchase history for the system; or a maintenance or service log for the system. Data structures 914 may also include one or more data structures configure to store, for each of a plurality of customers: a customer identifier, drink preferences, account information, a purchase history, one or more custom drink recipes, one or more preferred standard drink recipes, a history of received messages, an email address, and/or any other information that may be collectively referred to as a "customer profile". Similar information may also be stored on a loyalty debit card, in some embodiments. All or a portion of data structures 914 may be stored on an external storage device (not shown) accessible by the processor(s) 904, in some embodiments. Data structures 914 may be accessible by processor(s) 904 when executing program instructions 912. Other information not described herein may be included in system memory 910 and may be used to implement the methods described herein and/or other functionality of computer system 902.

In the example illustrated in FIG. 9, program instructions 912 may include instructions executable by processor(s) 904 to receive and act on various user inputs, and to control various components of the system, as described herein. In some embodiments, program instructions 912 may also include instructions executable to implement a user interface. For example, these instructions may be executable to provide a graphical user interface displayed on a touch screen or other type of monitor, to receive inputs from a coin/bill acceptor/changer, credit/loyalty card reader, RFID reader, video capture device, microphone, and/or proximity sensor, and/or to provide feedback through a display on a touch screen or other type of monitor. In some embodiments, program instructions 912 may include instructions executable by processor(s) 904 to control a coffee expressor, a coin/bill acceptor/changer, a receipt printer, a final product collection location, a loyalty card dispenser, a cup handler, a lid dispenser 114, a finisher 110 or 224, a presenter 134 or 232, and/or a speaker, as described herein.

Program instructions 912 may be provided as a computer program product, or software, that may include a computer-readable storage medium having stored thereon instructions, which may be used to program a computer system (or other electronic devices) to implement the control functions described herein. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As shown in FIG. 9, processor(s) 904 may be coupled to one or more of the other illustrated components by at least one communications bus, such as interconnect 908 (e.g., a system bus, LDT, PCI, ISA, or other communication bus type), and a network interface 906 (e.g., an ATM interface, an Ethernet interface, a Frame Relay interface, or other interface). Processor(s) 904, the network interface 906, and the system memory 910 may be coupled to the interconnect 908. It should also be noted that one or more components of system 902 might be located remotely and accessed via a network (e.g., through network interface 906).

Network interface 906 may be configured to enable computer system 902 to communicate with other computers, systems or machines, such as across a network. For example, in some embodiments, computer system 902 may communicate with a host server or other networked devices over a network in order to allow data to be exchanged between computer system 902 and these devices. In various embodiments, network interface 906 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol (e.g., LAN, WAN, etc.). Network interface 906 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 902 is interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 906 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

Computer system 902 may also include one or more I/O input/output devices, in various embodiments. For example, computer system 902 may include a touch screen or other type of monitor, a coin/bill acceptor/changer, a credit/loyalty card reader, an RFID reader, an image capture device (e.g. a video camera or still camera), a microphone, a proximity sensor, a receipt printer, a loyalty card dispenser, a speaker, a keyboard, a mouse or other cursor control device, a joystick, or other input/output devices, or such devices may be coupled to computer system 902 via interconnect 908 and/or network interface 906. Such input/output devices may be configured to allow a user to interact with the system to request or invoke various operations, such as dispensing a beverage or loyalty card, adding money to a loyalty card, configuring or modifying user preferences, etc. It will be apparent to those having ordinary skill in the art that computer system 902 may also include numerous other elements not shown in FIG. 9.

As described in detail herein, one embodiment of a system for brewing and dispensing coffee may include a coffee expressor containing two or more gravity filters configured to separate grounds from a brewed beverage, and a selection box configured (in a first position) to allow the brewed beverage to flow through the two or more gravity filters to produce filtered expressed coffee, and (in a second position) to interrupt the flow of the brewed beverage to the two or more gravity filters and allow waste products to be removed from the system. The system may also include a master controller configured to determine whether conditions of the system indicate that the system should transition from a brewing cycle to a cleaning cycle, and in response, to cause the selection box to move from the first position to the second position. In some embodiments, the master controller may include a processor and a memory configured to store program instructions executable by the processor to implement receiving one or more user or sensor inputs, and performing the determining operating dependent on the one or more user or sensor inputs.

In some embodiments, the system may include an initial gold filter configured to receive a mixture of water and grounds, and to filter the mixture to produce the brewed beverage. The system may also include a precision heater configured to heat the water to a temperature suitable for brewing the brewed beverage. In some embodiments, the system may include a user interface mechanism configured to receive input specifying one of more of: a beverage type, a beverage additive, a serving temperature, a customer identifier, a cup preference, or a payment type. In some embodiments, the system may include an ice machine and/or an ice delivery system, and may be configured to create iced drinks (e.g., iced coffee drinks), in addition to hot beverages. In some embodiments, the system may also include support for the production of other drink types, including, but not limited to, iced tea and Chai. In some embodiments, the master controller (or another component of the system) may be configured to calculate nutritional information for a selected drink, dependent on a base drink recipe and/or on any customizations selected by the customer.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

While various techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

What is claimed is:

1. A system comprising:
   a user interface mechanism comprising a video capture device;
   a facial recognition mechanism that during operation receives input from the video capture device and identifies a customer from the received input using facial recognition; and
   a controller that during operation and in response to said identifying:
      selects one of a plurality of standard or custom drink recipes dependent on the identity of the customer, wherein each drink recipe specifies an amount of two or more ingredients in a respective brewed beverage; and
      initiates production of a brewed beverage using the selected drink recipe,
   wherein during operation:
      the controller determines the actual temperature of the brewed beverage; and
      the user interface mechanism displays the determined temperature.

2. The system of claim 1, wherein to select the one of a plurality of standard or custom drink recipes the controller accesses information indicating one or more drink preferences of the identified customer from a data structure that stores customer-specific information.

3. The system of claim 2, wherein the data structure is stored on a loyalty card, debit card, or gift card and is accessed using the user interface mechanism.

4. The system of claim 2,
   wherein the system further comprises an interface that during operation communicates with a remote system;
   wherein the data structure comprises a database located on the remote system; and
   wherein the database stores customer-specific information for a plurality of customers.

5. The system of claim 2, wherein the customer-specific information further comprises one or more of: a customer identifier, account information, a purchase history, one or more custom drink recipes, one or more preferred standard drink recipes, one or more drink recipe names, a history of received messages, or an email address.

6. The system of claim 2, wherein, during operation, the user interface mechanism displays at least a portion of the customer-specific information.

7. The system of claim 1,
   wherein, during operation, the controller selects one or more messages to be displayed to the identified customer dependent on the identity of the identified customer; and
   wherein, during operation, the user interface mechanism displays the one or more selected messages to the identified customer.

8. The system of claim 1,
   wherein, during operation, the user interface mechanism receives additional input indicating a selection of one or more of:
      a standard drink recipe previously ordered by the identified customer;
      a custom drink recipe previously ordered by the identified customer; or
      a customization of a standard or custom drink recipe previously ordered by the identified customer, wherein the customization comprises one or more of: an ingredient to be added to the standard or custom drink recipe, an ingredient to be removed from the standard or custom drink recipe, or a change in an amount of an ingredient of the standard or custom drink recipe; and
   wherein to select the one of a plurality of standard or custom drink recipes the controller selects a drink recipe dependent on the additional input.

9. The system of claim 1, wherein during operation, the controller:
   determines a message to be displayed on a cup in which the brewed beverage is to be delivered dependent on one or more of: the identity of the customer or the selected drink recipe; and initiates labeling of the cup in which the brewed beverage is to be delivered with the determined message, wherein the determined message comprises one or more of: an identifier of the customer, a drink recipe name, a drink recipe, or a customer-specific message or advertisement.

10. The system of claim 1, further comprising a sensor that during operation:
   detects retrieval of a cup containing the brewed beverage; and
   communicates to the controller that the brewed beverage was retrieved.

11. The system of claim 1, further comprising a dispenser that during operation dispenses a loyalty card, a debit card, or a gift card.

12. The system of claim 1, wherein during operation:
   the user interface mechanism
      receives input specifying that a recommendation for one of the plurality of standard or custom drink recipes should be sent to another customer, or
      receives input specifying that one of the plurality of standard or custom drink recipes should be sent to another customer; and
   the controller tracks reuse of the recommended or sent drink recipe.

13. The system of claim 12,
   wherein during operation, the controller sends the recommendation for the one of the plurality of standard or custom drink recipes or the one of the plurality of standard or custom drink recipes to one or more customers, wherein the one or more customers comprises the other customer; and
   wherein to send the recommendation or the drink recipe, the controller sends the recommendation or the drink recipe to the one or more customers by email, sends the recommendation or the drink recipe to one or more phones, or shares the recommendation or the drink recipe with the one or more customers through a social networking site.

14. The system of claim 1, wherein the controller comprises the facial recognition mechanism.

15. The system of claim 1, wherein the video capture device includes the facial recognition mechanism.

16. A method, comprising:
   using a computer to perform:
   receiving input from a video capture device;
   identifying a customer from the received input using facial recognition;
   in response to said identifying:
      selecting one of a plurality of standard or custom drink recipes dependent on the identity of the customer, wherein each drink recipe specifies an amount of two or more ingredients in a respective brewed beverage; and
      initiating production of a brewed beverage using the selected drink recipe;
   determining the actual temperature of the brewed beverage; and
   displaying the determined temperature on a user interface mechanism.

17. The method of claim 16,
   wherein said selecting one of a plurality of standard or custom drink recipes comprises accessing information indicating one or more drink preferences of the identified customer from a data structure that stores customer-specific information for a plurality of customers; and
   wherein the customer-specific information further comprises, for each of the plurality of customers, one or more of: a customer identifier, account information, a purchase history, one or more custom drink recipes, one or more preferred standard drink recipes, one or more drink recipe names, a history of received messages, or an email address.

18. The method of claim 16, further comprising:
   using the computer to perform:
   receiving additional user input indicating a selection of one or more of:
      a standard drink recipe previously ordered by the identified customer;
      a custom drink recipe previously ordered by the identified customer; or
      a customization of a standard or custom drink recipe previously ordered by the identified customer, wherein the customization comprises one or more of: an ingredient to be added to the standard or custom drink recipe, an ingredient to be removed from the standard or custom drink recipe, or a change in an amount of an ingredient of the standard or custom drink recipe; and
   wherein said selecting one of a plurality of standard or custom drink recipes comprises selecting a drink recipe dependent on the additional user input.

19. The method of claim 16, further comprising:
   receiving input specifying that a recommendation for one of the plurality of standard or custom drink recipes should be sent to another customer or input specifying that one of the plurality of standard or custom drink recipes should be sent to another customer; and
   tracking reuse of the recommended or sent drink recipe.

20. A non-transitory, computer-readable storage medium storing program instructions that when executed on one or more computers cause the one or more computers to perform:
   receiving input from a video capture device;
   identifying a customer from the received input using facial recognition;
   in response to said identifying:
      selecting one of a plurality of standard or custom drink recipes dependent on the identity of the customer, wherein each drink recipe specifies an amount of two or more ingredients in a respective brewed beverage; and
      initiating production of a brewed beverage using the selected drink recipe;
   determining the actual temperature of the brewed beverage; and
   displaying the determined temperature on a user interface mechanism.

21. The computer-readable storage medium of claim 20,
   wherein said selecting one of a plurality of standard or custom drink recipes comprises accessing customer-specific information from a data structure that stores customer-specific information for a plurality of customers; and
   wherein the customer-specific information comprises, for each of the plurality of customers, one or more of: a customer identifier, account information, a purchase history, one or more custom drink recipes, one or more preferred standard drink recipes, a history of received messages, an email address, or one or more drink preferences.

22. The computer-readable storage medium of claim 20, wherein when executed by the one or more computers, the program instructions further cause the one or more computers to perform:
- receiving additional user input indicating a selection of one or more of:
  - a standard drink recipe previously ordered by the identified customer;
  - a custom drink recipe previously ordered by the identified customer; or
  - a customization of a standard or custom drink recipe previously ordered by the identified customer, wherein the customization comprises one or more of: an ingredient to be added to the standard or custom drink recipe, an ingredient to be removed from the standard or custom drink recipe, or a change in an amount of an ingredient of the standard or custom drink recipe; and
- wherein said selecting one of a plurality of standard or custom drink recipes comprises selecting a drink recipe dependent on the additional user input.

23. The computer-readable storage medium of claim 20, wherein when executed by the one or more computers, the program instructions further cause the one or more computers to perform:
- receiving input specifying that a recommendation for one of the plurality of standard or custom drink recipes should be sent to another customer or input specifying that one of the plurality of standard or custom drink recipes should be sent to another customer; and
- tracking reuse of the recommended or sent drink recipe.

* * * * *